April 28, 1936.   J. W. LEGGAT   2,039,010
LIFTING JACK DEVICE
Filed May 27, 1935   2 Sheets-Sheet 2
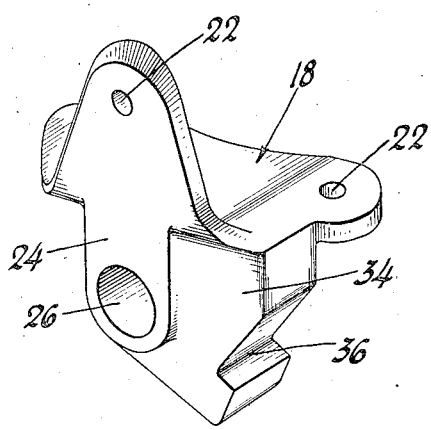
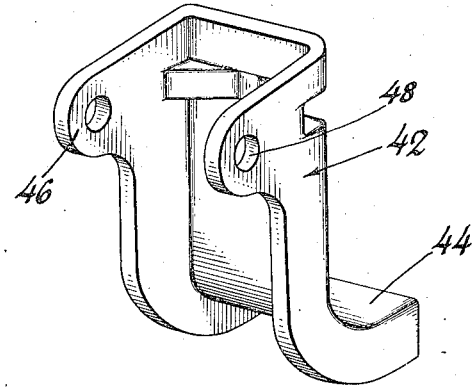
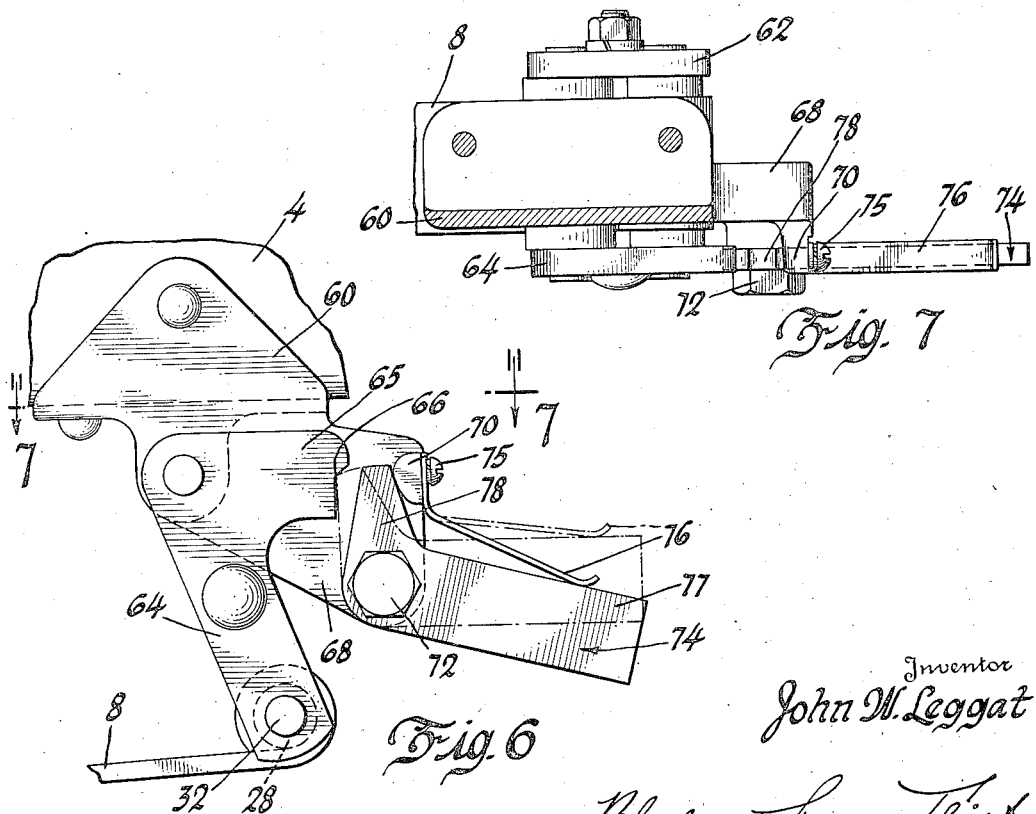

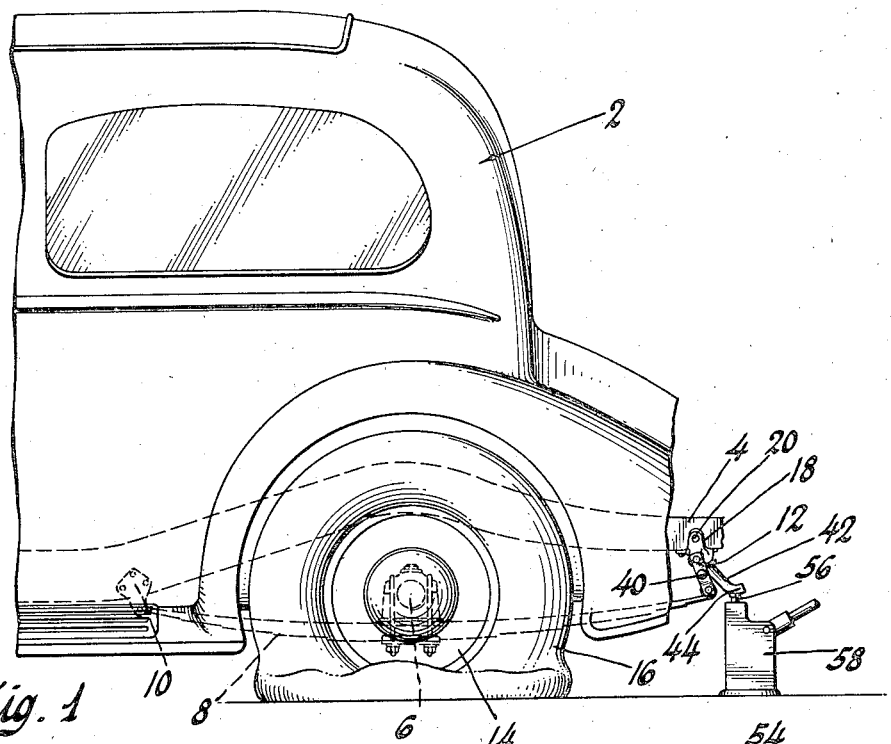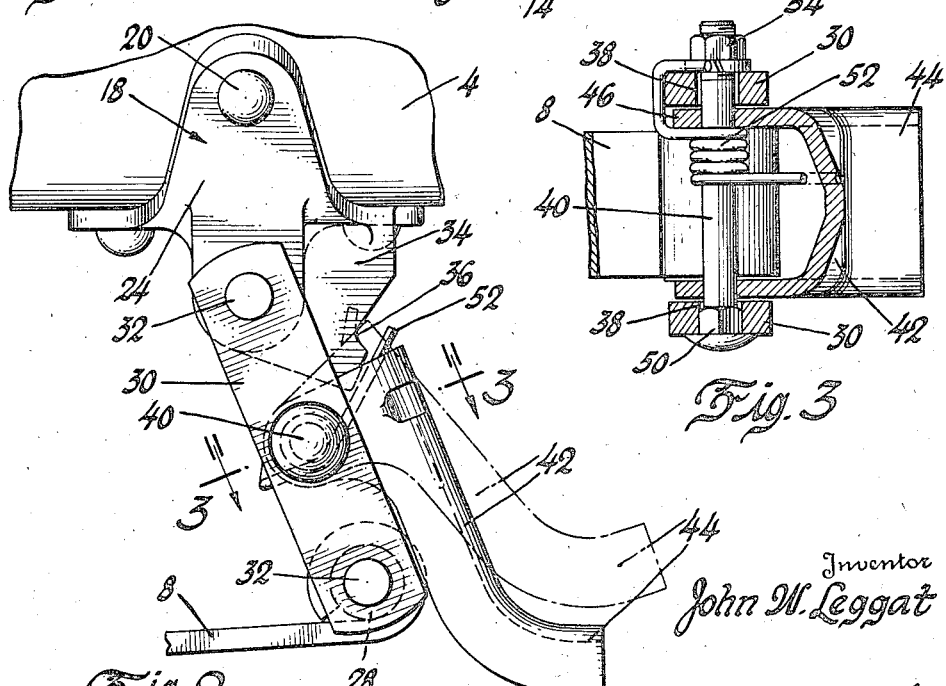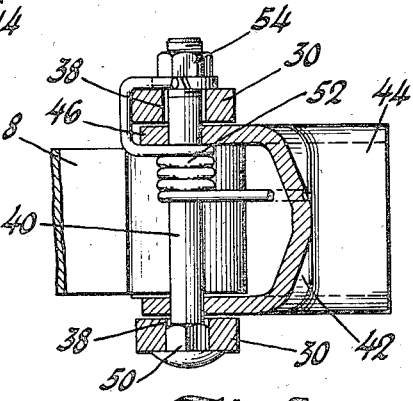

Patented Apr. 28, 1936

2,039,010

UNITED STATES PATENT OFFICE 2,039,010

LIFTING JACK DEVICE

John W. Leggat, Pontiac, Mich., assignor to General Motors Corporation, Pontiac, Mich., a corporation of Delaware Application May 27, 1935, Serial No. 23,685

7 Claims. (Cl. 267—54)

This invention relates to jacking devices for lifting an automobile wheel from contact with the ground and more specifically to means accessible from the outer end of the spring suspension of the body to keep the spring under tension when the jacking force is applied adjacent the outer end of the spring.

With the present design of automobiles they are being built lower and lower to make them more stable. While this makes them safer to operate at high speeds, it decreases to a considerable extent the accessibility of parts beneath the car such as, for example, the axles when a tire becomes deflated and it is necessary to place a jack under some portion to raise the axle to change the tire. It is, of course, much more convenient to place the jack under the outwardly extending end of the frame adjacent the shackle but when this is done, as the body is raised, the spring will sag and it is necessary to jack the car up to a much higher position than if the spring is kept under strain.

It is therefore an object of this invention to provide means whereby the car may be jacked by applying the jacking force at an accessible portion through a minimum distance.

It is a further object to provide means whereby the supporting spring will be kept under tension when the jacking force is applied at a point adjacent one of the shackles.

With these and other objects in view my invention resides in the construction as described in the following specification and claims and illustrated in the accompanying drawings, in which:

Fig. 1 is a side view of the rear portion of a motor car with parts broken away.

Fig. 2 is an enlarged side elevation of the spring shackle construction according to my invention.

Fig. 3 is a sectional view taken on the line 3—3 of Fig. 2.

Figs. 4 and 5 are detail perspective views of the interlocking parts of the device.

Fig. 6 is a side elevation of a spring shackle construction showing a modified form of my invention, and, Fig. 7 is a sectional view taken on the line 7—7 of Fig. 6.

Referring to Fig. 1, a motor car body 2 is supported on a frame 4 which is supported in turn upon an axle 6 by a semi-elliptic longitudinal spring 8, the forward end of the spring being pivotally connected to the frame by a bracket 10 and the rear end by a shackle assembly 12 which is the subject matter of my invention. The axle, as is conventional, carries a wheel 14 at its outer end upon which the tire 16 is mounted.

To the rear portion of the frame member 4 is secured an angled bracket 18 by rivets 20 which project through suitable holes 22 in the bracket and through the frame. The portion of the bracket that extends downwardly from the frame has a section 24 which is of substantially the same width as the spring 8 and has a transverse opening 26 therethrough to support one of the shackle bolts. The end of the spring is rolled over upon itself to form a support for a bushing 28 for the lower shackle bolt. Two parallel side members 30 extend from the end of the spring to the bracket 18 on opposite sides thereof and the whole assembly is secured together by two shackle bolts 32 that pass through each of the side members and the opening 26 and bushing 28 respectively.

The bracket 18 also has a downwardly extending portion 34 which is narrower than 24 so that the shackle arms will not rub against it and is of irregular shape. A notch 36 is cut into the side face which extends outwardly, the purpose of which will later be obvious.

In each of the side members 30 and approximately midway between their ends are provided aligned openings 38 through which a carriage bolt 40 passes and supports upon its central section a locking member 42 having a U-shaped cross section and flared out horizontally at its lower extremity 44. The side arm portions adjacent the top have lugs 46 in which are aligned holes 48 which engage the bolt to support the member. The openings 38 are angular to mate with the angular portion 50 of the bolt shaft just below the rounded head to prevent the bolt from turning.

Around the central shaft of the bolt is wound a spring 52 one end of which engages the upper lip of the locking member 42 and the other end is bent out around the shackle link to engage the nut 54 to hold the spring from turning. This biases the locking member to unlocked position, or in a clockwise direction as viewed in Fig. 2.

It will thus be seen that under normal circumstances the spring 52 will hold the lower end of the locking member against the end of the longitudinal spring 8 and the upper or locking lip out of engagement with the notch 36 of the bracket 18. However, if the tire becomes deflated and it is necessary to jack up the wheel to change the tire the movable jack head 56 of the jack 58 is placed under the horizontal portion 44 of the locking member 42 and raised. The weight of the car of course overcomes the resistance of the spring 52 and forces the upper lip of the member 42 with the notch 36 which causes a tensile force to be applied to the longitudinal spring 8 and prevent it from sagging as the car is jacked up so that it will lift the wheel with only the same amount of jacking that would be necessary if the jack was placed directly under the axle.

In Figs. 6 and 7 is shown a modified form of my invention which accomplishes the same result. In this form there is a bracket 60 riveted to the frame 4 as before which has a pair of aligned openings in the portion just below the frame for the upper shackle bolt. The inner shackle link 62 is of the same shape as before but the outer link 64 is made in the form of a bell crank, the lower ends of both links being attached to the end of the semi-elliptic spring 8 by a shackle bolt and the center of the bell crank is connected to the upper shackle bolt. The remaining leg 65 of the bell crank extends to the rear from the top portion and has a notch 66 cut in its rear face as best shown in Fig. 6. Between the two shackle links the bracket 60 has a section 68 which extends downwardly and rearwardly which has an angled end 70 extending over to lie in the same plane with the shackle link 64 and which forms a stop. Pivotally attached to the lower corner of the section 68 by bolt 72 is an L-shaped or bell crank lever 74 one end of which is adapted to oscillate in the space between the notch 66 and the stop 70. Attached to the stop by a screw 75 is a spring strip 76 the outer free end of which bears against the outer end 77 of the L-shaped lever and tends to produce a clockwise rotation of the lever about the bolt as viewed in Fig. 6. This also keeps the short or locking end 78 of the lever out of engagement with the notch 66.

In this form the head of the jack is adapted to be applied beneath the long lever arm 77 which forces this against the spring and its short end 78 into engagement with the notch 66 which as before keeps the semi-elliptical spring 8 under tension and jacks up the wheel.

I have herein illustrated a plurality of means by which the spirit of my invention may be carried out and it should be understood that the inventive concept involved should not be limited to the devices shown but only by the appended claims.

I claim:

1. In an automotive vehicle having a frame supported on an axle by semi-elliptic springs, a shackle connecting the outward end of the spring to the frame, interengaging means carried by the frame and the shackle, resilient means to normally keep them disengaged but capable of being overcome by a jacking force to allow said interengagement.

2. In spring supporting structure, a frame, a spring, rigid relatively movable means connecting the spring to the frame and additional interlocking means carried by the first named means and the frame normally nonengaging but capable of interengagement to prevent relative movement between the first named means and the frame.

3. In an automobile having a chassis frame supported on an axle by semi-elliptic springs, a shackle connecting the outer end of the spring to the frame, means secured to the frame forming one interlocking member, means secured to the shackle to engage the first means to lock with the same, one of said means being pivotally mounted and resilient means to normally bias the latter to out-of-contact position.

4. In a chassis supported on semi-elliptic springs, a shackle connecting the spring to the springs, means pivotally secured to the shackle frame, means pivotally secured to the shackle having a lip portion, means rigidly secured to the frame having a notch portion that the lip is adapted to engage and interlock to prevent the shackle from turning and keep the spring under tension.

5. In a chassis supported on semi-elliptic springs, a shackle connecting the spring to the springs, means pivotally secured to the shackle frame, means pivotally secured to the shackle having a lip portion, means rigidly secured to the frame having a notch portion that the lip is adapted to engage and interlock to prevent the shackle from turning and keep the spring under tension, and resilient means to normally keep the pivoted means in its non-locking position.

6. In a chassis supported on a semi-elliptic spring, a shackle connecting the spring with the frame including two side links, one of said side links being of the form of a bell crank and projecting outwardly from the shackle, a notch in the end of the crank arm, means pivotally secured to the frame adapted to engage the notch and resilient means biasing the latter means to non-engaging position.

7. In a chassis supported on semi-elliptic springs by a shackle, two interengaging bell crank levers, one forming a part of the shackle and the other pivotally secured to the frame whereby when they engage the shackle is locked against turning to allow the spring to sag.

JOHN W. LEGGAT.